(No Model.)
M. B. GOOING.
COMBINED PLANTER, CULTIVATOR, AND HARROW.
No. 564,612. Patented July 28, 1896.
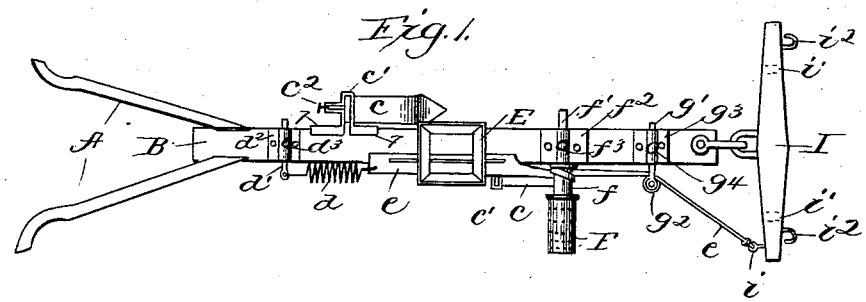
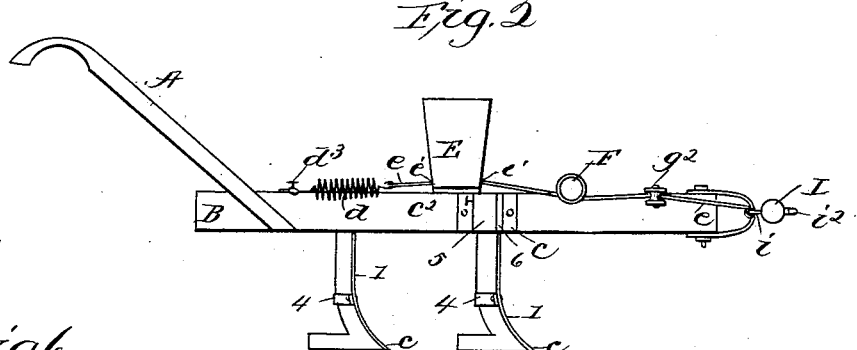
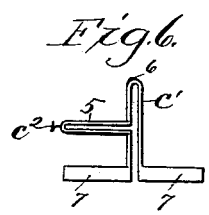
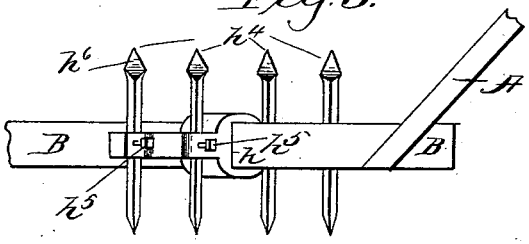
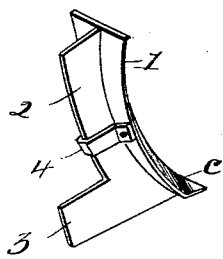
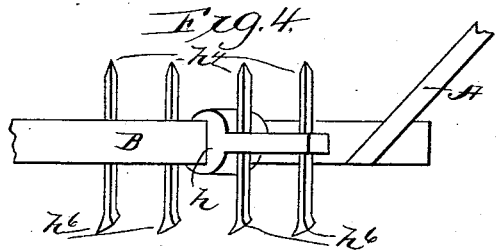
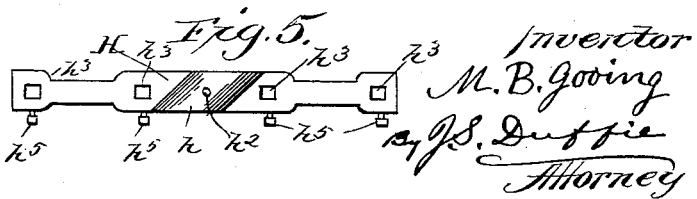

UNITED STATES PATENT OFFICE.

MARTIN BIRD GOOING, OF BASTROP, LOUISIANA.

COMBINED PLANTER, CULTIVATOR, AND HARROW.

SPECIFICATION forming part of Letters Patent No. 564,612, dated July 28, 1896.

Application filed November 4, 1895. Serial No. 567,871. (No model.)

*To all whom it may concern:*

Be it known that I, MARTIN BIRD GOOING, a citizen of the United States, residing at Bastrop, in the parish of Morehouse and State of Louisiana, have invented certain new and useful Improvements in a Combined Planter, Cultivator, and Harrow; and I do hereby declare the following to be a full, clear, and exact description of the invention, such as will enable others skilled in the art to which it appertains to make and use the same.

My invention is a double-shovel corn-planter, harrow, and poison-distributer; and it consists in the novel construction and arrangement of its parts.

In the accompanying drawings, Figure 1 is a top plan view of my invention. Fig. 2 is a side elevation. Figs. 3, 4, 5, 6, 7, and 8 are detail views.

My invention is described as follows: Handles A may be fastened to beam B by means of bolts and nuts, beam B being so constructed as to carry two plows $c$ $c$, fastened to beam B by malleable-iron clamps or cuffs $c'$ and set-screws $c^2$, the two plows being used to open and cover in planting and also used as a double shovel in cultivating.

Wire spring $d$ is fastened to shaft $d'$ and is also fastened to beam B by means of a half-cuff $d^2$ and set-screw $d^3$. Slotted leather belt $e$, fastened to wire spring $d$, passes through corn-hopper E, which has in its bottom a slot $e'$ for the passage of said belt $e$, and through which the corn drops on either side of the hopper E as it is reciprocated. As the horse steps along the spring $d$ pulls the belt $e$ back and forth through the hopper E. Belt $e$ is also used for distributing poison, passing over pulley $f$ of the drum F, causing it to rotate and sift the poison out through the perforations in the drum F, which rotates on a shaft $f'$, fastened to beam B by a half-clamp $f^2$ and set-screw $f^3$. All shafts $d'$, $f'$, and $g'$ being movable enables one to move them in or out from the row when using the side harrow or smaller plows.

The poison is carried in the drum F, which distributes it on the young plants, while the plow cultivates the young crop at the same time with double shovel $c$ $c$ and harrow H. Idler $g^2$ works on shaft $g'$, which is secured to the beam by a half-cuff $g^3$ and set-screw $g^4$ and holds the belt $e$ in line with the corn-planter E and the pulley $f$ of the distributer F.

Singletree I carries on its right-hand end the hook-bolt $i$, to which the belt $e$ is attached, and as the horse steps along, thereby operating the belt of the corn-planter E and poison-distributer F by the resistance of spring $d$ and the reciprocating motion of the singletree. Singletree I has different holes $i'$ for changing the hooks $i^2$, to which the horse is fastened, for the purpose of giving more vibration and consequently more or less rotation to the drum F to lessen or increase the quantity of poison, as required.

Side harrow H may be made of malleable iron of suitable size, having through its center a perforation $h$ at an angle of forty-five degrees to its face through which the beam B passes, and is fastened back near the handle at its proper place by means of bolt or set-screw $h^2$, said beam having square holes $h^3$ for teeth $h^4$, fastened by set-screws $h^5$. Either end of the teeth can be used. I call especial attention to wide point $h^6$ of the harrow-tooth.

The plow $c$ is constructed of three parts, the face-plate 1, the rib 2, having the tailpiece 3, and the clip 4, which secures the rib to the plate. The clamp $c'$ consists of a U-bend 5, which holds the rib 2 in place, U-bend 6, which holds the plate 1 in place, and of the arms 7, by means of which the said clamp is secured to the beam.

It is not essential that all the parts of my double-shovel corn-planter, harrow, and poison-distributer should be used at the same time. I may or may not use the harrow with the plows, or I may use the harrow and dispense with the plows.

In cultivating the young crop it is not necessary to use the corn-hopper, but I may use it, if I see proper, to distribute fertilizing material in the furrow made by the plow that immediately precedes it, and in planting the crop I may remove the drum F if I desire to do so.

Every part of my invention is readily detachable from the beam B except the handles.

Having described my invention, what I claim as new, and desire to secure by Letters Patent, is—

1. The combination of the beam B, clamps $c'$, provided with the elbows 5 and 6, extensions 7 and thumb-screw $c^2$; plows $c$, consisting of the face 1, rib 2, having the tail 3, and clamp 4, substantially as shown and described and for the purposes set forth.

2. The combination of the beam B, shaft $d'$, spring $d$, slotted belt $e$, corn-hopper E, drum F, pulley $f$, idler $g^2$, belt-hook $i$, and singletree I, substantially as shown and described and for the purposes set forth.

In testimony whereof I affix my signature in presence of two witnesses.

MARTIN BIRD GOOING.

Witnesses:
   PEYTON M. SPEAR,
   EDWARD T. BRODNOX.